No. 690,133. Patented Dec. 31, 1901.
A. CLEMM & W. HASENBACH.
PROCESS OF MAKING SULFURIC ANHYDRID.
(Application filed Mar. 5, 1900.)
(No Model.) 2 Sheets—Sheet 1.
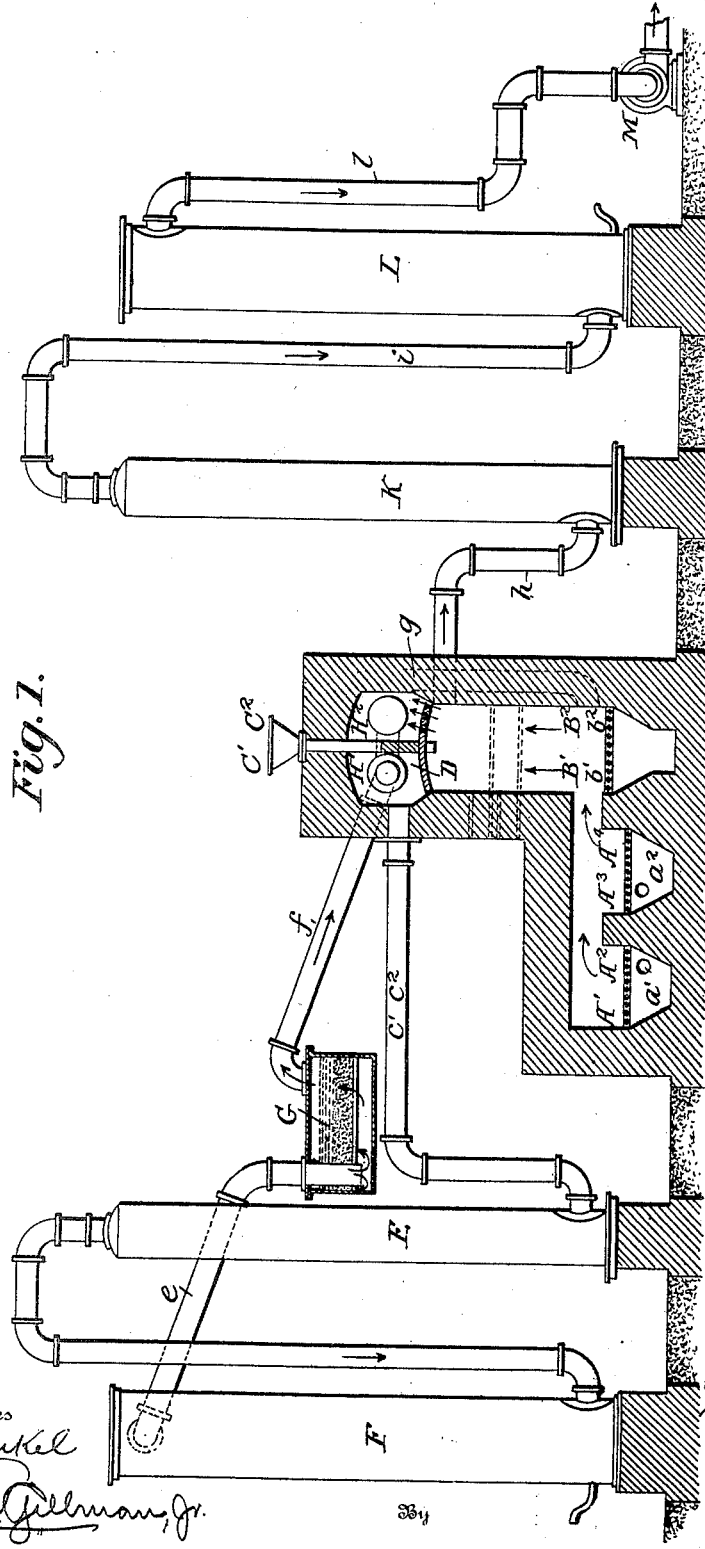

No. 690,133. Patented Dec. 31, 1901.
A. CLEMM & W. HASENBACH.
PROCESS OF MAKING SULFURIC ANHYDRID.
(Application filed Mar. 5, 1900.)
(No Model.) 2 Sheets—Sheet 2.
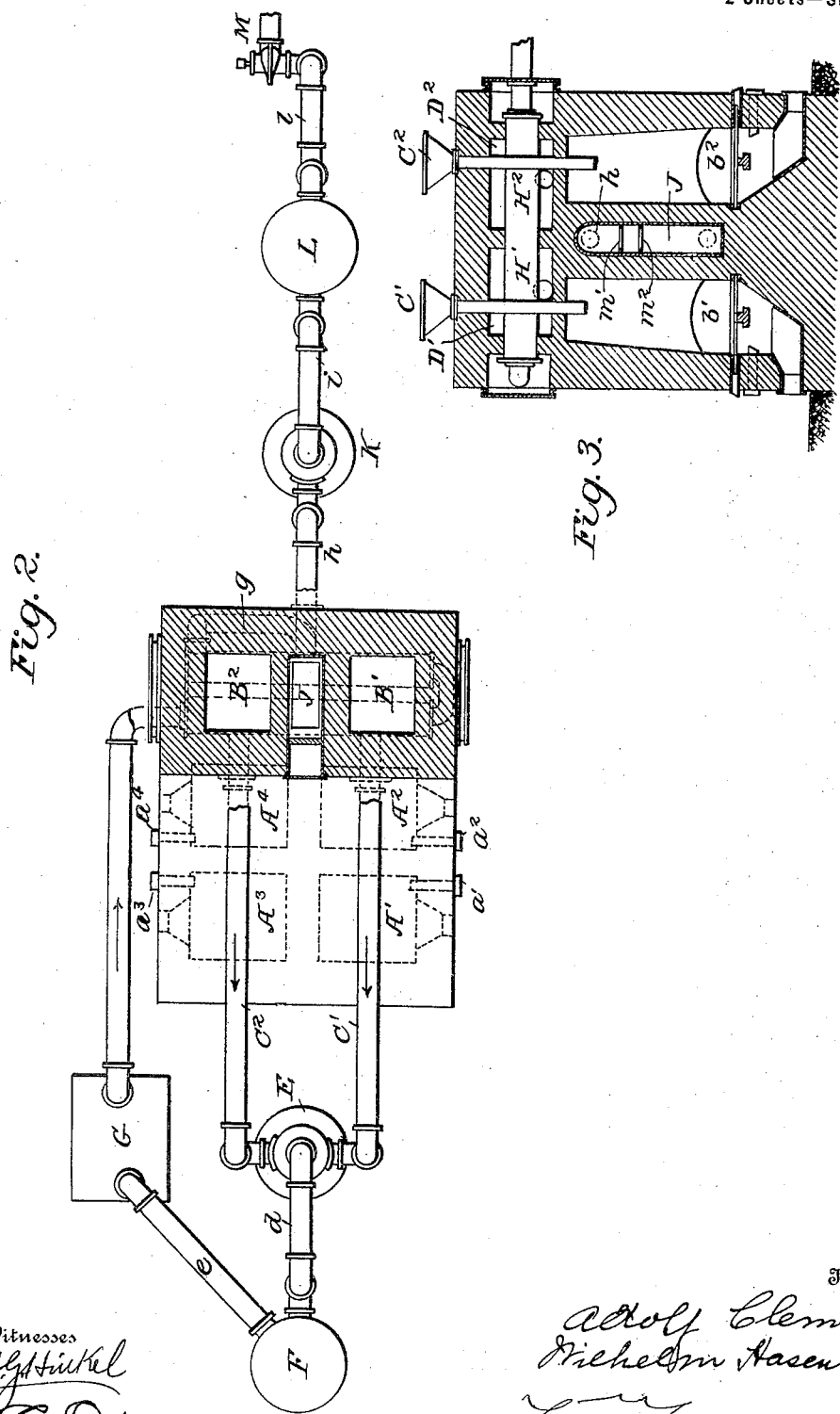

UNITED STATES PATENT OFFICE.

ADOLF CLEMM AND WILHELM HASENBACH, OF MANNHEIM, GERMANY.

PROCESS OF MAKING SULFURIC ANHYDRID.

SPECIFICATION forming part of Letters Patent No. 690,133, dated December 31, 1901.

Application filed March 5, 1900. Serial No. 7,344. (No specimens.)

*To all whom it may concern:*

Be it known that we, ADOLF CLEMM and WILHELM HASENBACH, subjects of the Emperor of Germany, and residents of Mannheim, Germany, have invented certain new and useful Improvements in the Manufacture of Sulfuric Anhydrid, of which the following is a specification.

It has been proposed to convert sulfurous acid into sulfuric anhydrid by means of finely-divided platinum; but the heat of the reaction of sulfurous acid and oxygen upon the platinum has prevented the perfect combination of the two gases, and a further disadvantage is that the impurities with which technical sulfurous acid is charged settle upon the platinum and in a short time render it inoperative. To overcome these defects, it has hitherto been necessary to use cooling apparatus to reduce the heat evolved during the reaction, and it has also been necessary to submit the gases before they enter the contact space or chamber to a careful and complicated washing or purifying process by thoroughly mixing the gases with the washing liquid until tests show that all injurious constituents have been removed. Burnt pyrites or analogous substances containing ferric oxid have also been used as contact substances, the sulfurous acid being produced by roasting sulfurous pyrites with the admission of previously-dried air, the gases thus obtained being brought into contact with the burnt pyrites or other substance containing ferric oxid at the same temperature as that of the roasting-chamber. Although this may be regarded to give good results, for obtaining such results in actual practice prolixities arise in the installation of the apparatus necessary for the purpose, inasmuch as for obtaining a theoretical yield of anhydrid it is necessary to lead the gases repeatedly over the burnt ore previously having absorbed the anhydrid formed by the preceding reaction, and it is therefore desirable to avoid these repeated prolix operations. The object of this invention is to overcome the objections hitherto experienced, and this is done principally by combining the aforesaid two processes with the interposition of a dry-filtering operation.

According to this invention the roaster-gases produced from sulfurous pyrites with the admission of previously-dried air are conducted once only over highly-heated burnt pyrites or other substance containing ferric oxid, and afterward the said gases are subjected to dry filtering, and they are afterward admitted to the platinum contact space or chamber, by which means the advantages of both methods above referred to are obtained, while their disadvantages are avoided.

While the gases (produced with the use of previously-dried air) pass over the burnt pyrites or other substance containing ferric oxid, not only is a considerable part of the sulfurous acid converted into sulfuric anhydrid, but the gases are also at the same time purified, partly by mechanical filtration and partly by chemical absorption, so that they do not injure the platinum contact substance subsequently used. Furthermore, owing to a considerable part of the sulfurous acid being converted into sulfuric anhydrid as the gases pass once over the burnt pyrites or other substance containing ferric oxid the proportion of sulfurous acid still present in the gases is so materially reduced before the gases enter the platinum contact space or chamber that by the time the said gases come into contact with the platinum the heat arising from reaction does not increase to a degree necessitating the employment of special cooling apparatus. As, however, such gases retain slight traces of impurities, which unless removed could still injure the platinum, it is necessary to subject the said gases to dry filtration before permitting them to come into contact with the platinum, and this may, if desired, be preceded by absorption of the sulfuric anhydrid already formed. For the purpose of the filtration granular porous substances or fibrous or felted fabrics of acid-proof and fireproof material—such as pumice-stone, asbestos, and the like—are used.

Should the gases on their way to the platinum contact space or chamber lose so much of their heat that their temperature is no longer sufficient to start the reaction with the platinum, the heat is restored to the necessary degree, which may be done by causing the gases to pass through reheating apparatus on their way from the filtering apparatus to the platinum contact space or chamber. This reheating apparatus may be heated with advantage by the heat from the roasting-furnace.

The platinum contact mass is preferably used in the form of platinized grating or network or platinized fabric, which may be carried by a frame or by frames within the contact space or chamber, the gases passing through the contact mass in any desired direction, such as horizontally or vertically, downward or upward.

The sulfuric anhydrid produced may be absorbed by sulfuric acid in the well-known or any suitable manner.

In the accompanying drawings we have illustrated an apparatus by means of which our process may be carried out, in which—

Figure 1 is an elevation, partly in section, of such apparatus. Fig. 2 is a plan of same, part being in section. Fig. 3 is a transverse vertical section of the roasting-furnace.

$A'$ $A^2$ $A^3$ $A^4$ are the roasting-spaces of the pyrite-roasting furnace, which is provided with an outer protecting-cover of iron. The air necessary for the roasting process enters the roasting-furnaces below the grate by the openings $a'$ $a^2$ $a^3$ $a^4$. The roasting-gases generated in the furnaces $A'$ and $A^2$ enter the space $B'$, and those of the furnaces $A^3$ and $A^4$ enter the space $B^2$. These spaces are filled with burnt ore or other iron-oxid-containing materials, which rest upon the turning grates $b'$ $b^2$, by which the used waste contact mass is removed, while a fresh one is filled in by filling apparatus $C'$ $C^2$, which can be closed.

In the spaces $B'$ and $B^2$ the greater part of the sulfurous acid contained in the roaster-gases is converted into sulfuric anhydrid, and the arsenic contained in said gases is chemically bound by the iron oxid of the contact mass. The gases enter the spaces $D'$ and $D^2$ and are let by tubes $c'$ $c^2$ into the cylindrical cooling vessel E, the outer walls of which are rinsed with water. By tubes $d$ the cooled gases enter the absorbing vessel F, in which concentrated sulfuric acid flows, which absorbs the generated sulfuric anhydrid. The gases which are thus freed from the sulfuric anhydrid leave the vessel F at its top. They contain the rest of the not-decomposed sulfurous acid and are led by the tube $e$ into a vessel G. The latter is filled with granular or fibrous substances—as, for instance, sand of slags, pumice-stone, asbestos, and the like. The gases are forced through these substances and undergo thereby a filtering process. The filtered gases are conducted by the tubing $f$ into the cast-iron vessels $H'$ $H^2$, placed in the spaces $D'$ $D^2$, in which they are brought at the necessary temperature by the waste gases passing through the spaces $D'$ $D^2$. The heated gases are conducted by the tube $g$ into the space J, which is placed between the spaces $B'$ and $B^2$, by which it is kept warm. In this space the platinum contact mass is arranged in horizontal layers $m'$ and $m^2$, through which the gases must pass, whereby the conversion of the sulfurous acid still contained in them into sulfuric anhydrid is effected. By a tube $h$ the gases are conducted into the cooling vessel K and by the tube $i$ into the absorbing vessel L, in which the formed anhydride is retained by concentrated sulfuric acid. The thus-exhausted gases are aspired by the ventilator M through the tube $l$ and escape into the atmosphere.

Having now particularly described and ascertained the nature of this invention and in what manner the same is to be performed, we declare that what we claim is—

1. The herein-described process of producing sulfuric anhydrid, which consists in passing roaster-gases over substances containing ferric oxid, then purifying the gases by dry filtering and then passing them over platinum contact substances.

2. The herein-described process of manufacturing sulfuric anhydrid which consists in first passing a mixture of sulfurous acid and dry air at a suitable temperature over materials containing iron oxid in order to purify the mixture and to convert partly into sulfuric anhydrid, then separating by absorption the sulfuric anhydrid formed and bringing the remainder of the mixture again to the required temperature, and finally passing the said remainder of the mixture over a platinum contact substance in order to convert it into anhydrid.

3. The herein-described process of manufacturing sulfuric anhydrid, which consists in first passing dry air over pyrites while they are roasting, then passing the generated mixture of dry air and sulfurous acid at the temperature assumed in the roasting over materials containing iron oxid in order to purify the mixture and to convert it partly into sulfuric anhydrid, then separating by absorption the sulfuric anhydrid formed and bringing the remainder of the mixture again to the required temperature, and finally passing the said remainder of the mixture over a platinum contact substance in order to convert it into anhydrid.

4. The herein-described process of manufacturing sulfuric anhydrid, which consists in first passing a mixture of sulfurous acid and dry air at a suitable temperature over materials containing iron oxid in order to purify the mixture and to convert it partly into sulfuric anhydrid, then separating by absorption the sulfuric anhydrid formed, then passing the remainder of the mixture through a filter of porous materials in order to thoroughly clean it, and bringing it again to the required temperature, and finally passing the said remainder of the mixture over a platinum contact substance in order to convert it into anhydrid.

5. The herein-described process of manufacturing sulfuric anhydrid, which consists in first passing a mixture of sulfurous acid and dry air at a suitable temperature over materials containing iron oxid in order to purify the mixture and to convert it partly into sulfuric anhydrid, then separating by absorption the sulfuric anhydrid formed, then passing the remainder of the mixture through a filter of porous materials in order to thoroughly clean it, and bringing it again to the required temperature, and finally passing the said remainder of the mixture over a platinum contact substance arranged in the form of fireproof screen-like fabrics in order to convert it into anhydrid.

In testimony whereof we have signed our names to this specification in the presence of two subscribing witnesses.

ADOLF CLEMM.
WILHELM HASENBACH.

Witnesses:
JACOB ADRIAN,
H. W. HARRIS.